Figure 1:
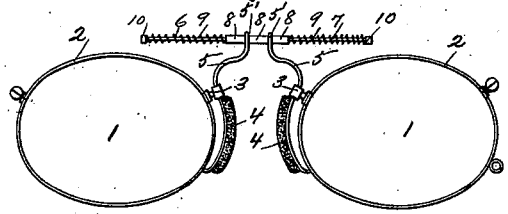

(No Model.) 2 Sheets—Sheet 1.

J. H. E. DE CELLES & G. W. WELLS.
EYEGLASSES.

No. 499,320. Patented June 13, 1893.

Witnesses

Inventors
J. H. Ernest De Celles,
George W. Wells,
By Attorney
John C. Dewey.

(No Model.) 2 Sheets—Sheet 2.

J. H. E. DE CELLES & G. W. WELLS.
EYEGLASSES.

No. 499,320. Patented June 13, 1893.

Witnesses

Inventors
J. H. Ernest De Celles,
George W. Wells,
By Attorney
John C. Dewey

UNITED STATES PATENT OFFICE.

JOSEPH H. ERNEST DE CELLES AND GEORGE W. WELLS, OF SOUTHBRIDGE, MASSACHUSETTS, ASSIGNORS TO THE AMERICAN OPTICAL COMPANY, OF SAME PLACE.

EYEGLASSES.

SPECIFICATION forming part of Letters Patent No. 499,320, dated June 13, 1893.

Application filed January 13, 1893. Serial No. 458,193. (No model.)

*To all whom it may concern:*

Be it known that we, JOSEPH H. ERNEST DE CELLES and GEORGE W. WELLS, both citizens of the United States, and both residing at Southbridge, in the county of Worcester and State of Massachusetts, have jointly invented certain new and useful Improvements in Eyeglasses; and we do hereby declare that the following is a full, clear, and exact description thereof, which, in connection with the drawings making a part of this specification, will enable others skilled in the art to which our invention belongs to make and use the same.

Our invention relates to eyeglasses, and more particularly to that class of eyeglasses in which the lenses are moved apart in a straight line, and the object of our invention is to improve upon the construction of the eyeglasses referred to, as now ordinarily made, and to provide a strong and durable eyeglass in which the lenses are moved apart in a straight line, and are strongly and firmly connected, and are maintained in a fixed vertical plane, relatively to the nose bridge or connection between the lenses, so that they will not bend or get out of shape.

The nose bridge or connection between the lenses consists of two independent parallel rods extending in opposite directions, and preferably in a horizontal plane, with one end of each rod rigidly secured to one of the bridge side arms, and the rod itself supported and having its bearing in the upper end of the other bridge side arm, which is preferably provided with a tube rigidly secured thereto, and extending out from one or both sides thereof, for steadying and stiffening the rod and preventing the bending or twisting of the same. A spiral spring is supported on one of the rods, or there may be two springs, one on each rod, which act to move the lenses toward each other after they have been drawn apart.

Instead of the tubular construction for supporting the rods, plates or bars may be used which are rigidly attached to one of the rods and adapted to move on the other rod, the result obtained being substantially the same as in the tubular construction.

Our invention consists in certain novel features of construction of the nose bridge or connection between the lenses, above referred to, as will be hereinafter fully described, and the nature thereof indicated by the claims.

Figure 2:
Figure 3:
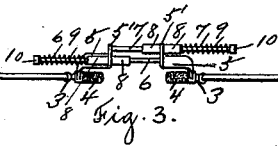
Figure 4:
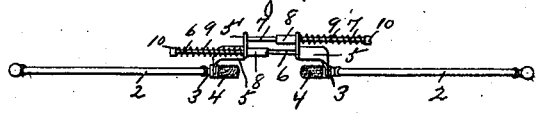
Figure 5:
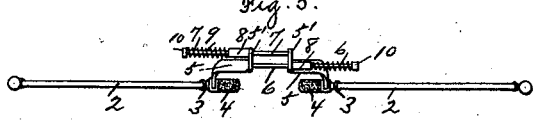
Figure 6:
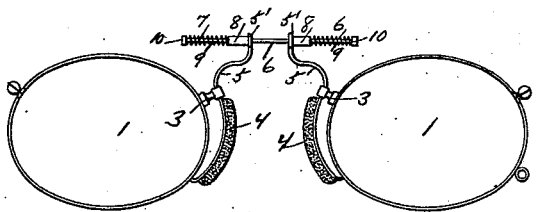
Figure 7:
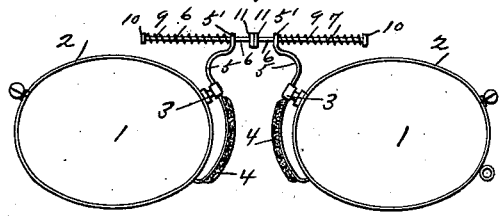
Figure 8:
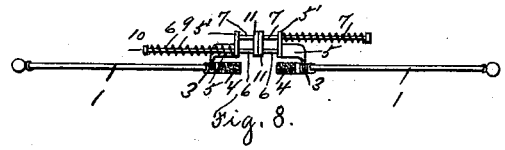
Figure 9:
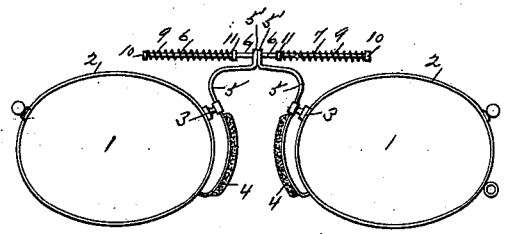
Figure 10:
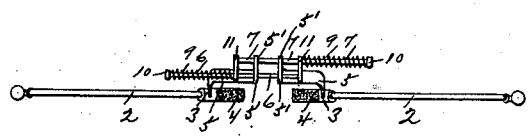

Referring to the drawings:—Figure 1 is a front view of an eyeglass embodying our improvements. Fig. 2 is a plan view of the eyeglass shown in Fig. 1. Fig. 3 corresponds to Fig. 2, but shows the lenses drawn apart. Fig. 4 is a plan view of a modified construction of the eyeglass shown in Fig. 3. Fig. 5 is a plan view of another modification. Fig. 6 is a front view of the eyeglass shown in Fig. 5. Fig. 7 is a front view of another modification. Fig. 8 is a plan view of the eyeglass shown in Fig. 7. Fig. 9 is a front view of another modification, and Fig. 10 is a plan view of the eyeglass shown in Fig. 9, with the lenses drawn apart.

In the accompanying drawings, the lenses 1, wire rims 2, posts 3, and nose pieces or guards 4, may be of any ordinary construction, as our present invention relates only to the nose bridge or connection between the lenses. The bridge side arms 5 are preferably secured at their lower ends to the posts 3, and extend upwardly with their upper ends 5' preferably on a line with, or a little above the top of the rims 2. In the upper ends 5' of the bridge side arms 5, which are preferably bent toward each other as shown in the drawings, are supported the two rods 6 and 7, which form the nose bridge or connection between the lenses, and which extend parallel to each other, and preferably in a horizontal plane. One end of each rod is rigidly secured to the upper end 5' of one of the side bridge arms 5, by extending into a hole in said end or otherwise, and each rod is supported and moves longitudinally in a tube 8, which preferably extends out from both sides of upper end 5' of the bridge side arm 5, as shown in Figs. 1, 2, and 3. The tubes 8 are rigidly secured at their inner ends to the upper ends 5' of the bridge side arms 5, and form a part of said side arms. By means of the tubes 8, preferably extending out from both sides of the bridge side arms 5, as shown in Fig. 3, we provide a long bearing for the rods 6 and 7, to slide in, and thus stiffen and render firmer the bridge or connection between the two lenses to maintain the lenses in their proper position. Two spiral springs 9 are preferably employed, one spring supported on each of the rods 6 and 7, between a knob 10 on the end of each rod and the outer end of the tube 8, on the outside of the bridge side arms 5. When the lenses are drawn apart the springs 9 are compressed, and when the lenses are released the springs 9 tend to move the lenses toward each other and grip the nose guards on the nose of the wearer. Instead of having the supporting tubes 8 extend out from both sides of the upper ends 5' of the bridge side arms 5, as shown in Figs. 1, 2, and 3, said tubes may extend only from the inner side of the bridge side arms, as shown in Fig. 4, in which case the spiral springs 9 will extend between the knobs 10 and the bridge side arms; the tubes 8 may extend only from the outer side of the bridge side arms, as shown in Figs. 5 and 6. Instead of having the tubular bearings for supporting the nose bridge or connection between the lenses, and preventing the lenses from twisting and getting out of shape, we may substitute two plates or bars 11, supported on the rods 6 and 7, which extend through holes in said plates, with one plate rigidly secured to one rod, and the outer plate rigidly secured to the other rod, at a distance from each bridge side arm as shown in Fig. 8, corresponding substantially to the length of the tubes 8, extending between the side arms, as shown in Fig. 2; each rod slides freely through a hole in the other end of each plate 11. The plates 11 may be supported on the rods 6 and 7 on the inside of the bridge side arms 5, as shown in Figs. 7 and 8, or they may be supported on the outside, as shown in Figs. 9 and 10, in which case the extreme end of each rod will be secured to said plate instead of to the bridge side arm. The spiral springs 9, supported on the rods 6 and 7 extend between the knobs 10 on the end of said rods and the bridge side arms 5, as shown in Figs. 7 and 8, or between the knobs 10 and the plates 11, as shown in Figs. 9 and 10.

The advantages of our improvements will be readily appreciated by those skilled in the art.

We provide for eyeglasses a very simple and inexpensive nose bridge or connection between the lenses, and we provide means for firmly supporting the two rods, which form the nose bridge, in the bridge side arms, so that the lenses will be maintained in a fixed vertical plane, relatively to the nose bridge or connection between them, and will not become twisted or bent out of shape.

It will be understood, that the details of construction of our improvements may be varied somewhat if desired, and instead of two springs, one spring may be employed as shown in Fig. 2.

Having thus described our invention, what we claim as new, and desire to secure by Letters Patent, is—

1. In eyeglasses, the combination with the bridge side arms, of two parallel rods forming the nose bridge or connection between the lenses, one end of each rod secured to one of the bridge side arms, and each rod supported and adapted to move in the upper end of the other bridge side arm, and a spiral spring supported on one of the rods on the outside of the bridge side arms, for the purpose stated, substantially as set forth.

2. In eyeglasses, the combination with the bridge side arms, and a tube secured to the upper end of each arm, of two parallel rods, one end of each rod secured to the upper end of one of the bridge side arms, and each rod supported and adapted to move in the tube secured to the upper end of the other bridge side arm, and a spiral spring supported upon one of the rods upon the outside of the bridge side arms, for the purpose stated, substantially as set forth.

3. In eyeglasses, the combination with the bridge side arms, provided with tubular bearings at their upper ends, of two parallel rods forming the nose bridge or connection between the lenses, one end of one rod secured to one bridge side arm, and one end of the other rod secured to the other bridge side arm, and each rod supported and adapted to slide in the tubular bearings, and spiral springs supported on said rods, on the outside of the bridge side arms, for the purpose stated, substantially as set forth.

4. In eyeglasses, the combination with the bridge side arms, of two parallel rods forming the nose bridge or connection between the lenses and extending in a horizontal plane, with one end of one rod secured to one of the bridge side arms, and one end of the other rod secured to the other bridge side arm, and each rod supported and sliding in the upper end of the bridge side arm to which it is not secured, and spiral springs supported on said rods, on the outside of the bridge side arms, for the purpose stated, substantially as shown and described.

J. H. ERNEST DE CELLES.
GEORGE W. WELLS.

Witnesses:
AUGUSTUS COOK,
E. ADELLE SANDERS.